Figure 1:
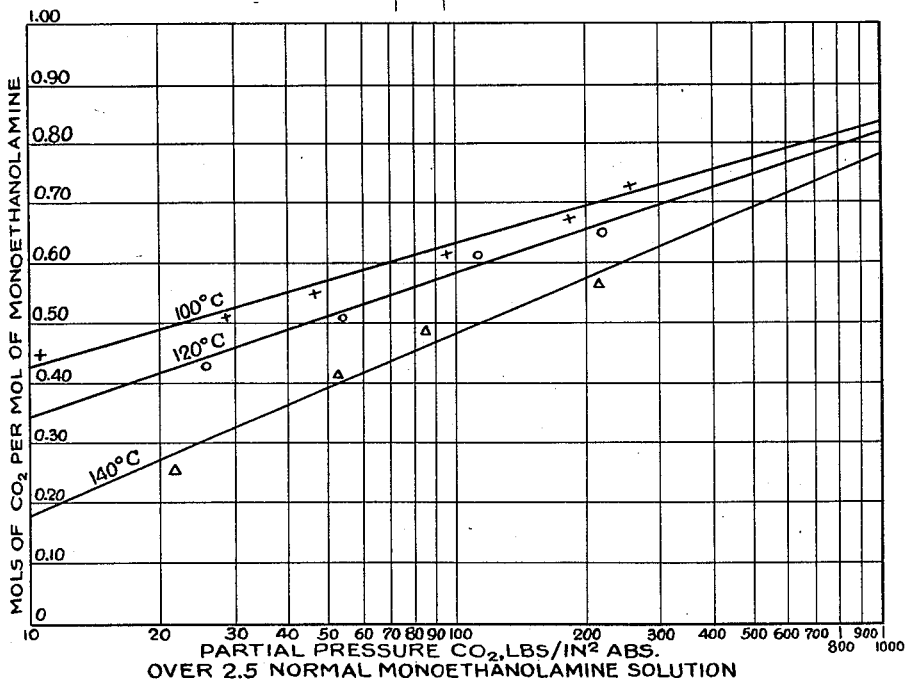

April 23, 1946.  R. M. REED  2,399,142

THERMAL DISSOCIATION OF MONOETHANOLAMINE SALTS

Filed June 22, 1942

INVENTOR
Robert M. Reed
BY
ATTORNEYS

Patented Apr. 23, 1946

2,399,142

UNITED STATES PATENT OFFICE 2,399,142

THERMAL DISSOCIATION OF MONO-ETHANOLAMINE SALTS

Robert M. Reed, Louisville, Ky., assignor to The Girdler Corporation, Louisville, Ky., a corporation of Delaware Application June 22, 1942, Serial No. 447,996

9 Claims. (Cl. 23—2)

This invention relates to the thermal dissociation of salts of monoethanolamine (2-aminoethanol), particularly the monoethanolamine salts of carbonic and hydrosulphuric acids.

It is well known that these salts when in solution can be dissociated by heating, and commercial use has been made of such reaction for recovering the acids.

I have now discovered that by suitable control of the conditions under which the thermal dissociation of monoethanolamine salts is carried out, certain desirable results may be achieved.

The primary reactions between monoethanolamine and hydrosulphuric and carbonic acids are reversible:

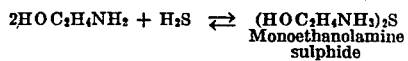

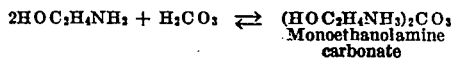

The equilibria in these reactions shift rapidly with temperature and with the concentration of hydrogen sulphide or carbon dioxide in and over the solution. The salts may be dissociated in solutions containing them by heating to the boiling point at substantially atmospheric pressure while passing a stripping gaseous medium such as steam through the solution to remove the liberated hydrogen sulphide or carbon dioxide. Under these conditions hydrogen sulphide can be completely separated from monoethanolamine with comparative ease, but complete dissociation of monothanolamine carbonate does not take place. The boiling and steam stripping at atmospheric pressure, which is sufficient to completely dissociate monoethanolamine sulphide in an aqueous solution, will leave approximately 0.32 mol of monoethanolamine carbonate per mol of free monoethanolamine in a comparable monoethanolamine carbonate solution. Further steam stripping at atmospheric pressure of the carbonate solution produces only a very gradual decrease in this residual carbonate content. Thus for complete removal of the carbon dioxide from the solution, a tremendous expenditure of thermal energy is required.

This difference in behavior between monoethanolamine sulphide and monoethanolamine carbonate is presumably due to the fact that carbon dioxide is slightly more acidic than hydrogen sulphide. The primary dissociation constant for carbonic acid is $3\times10^{-7}$ at 18° C., and for hydrosulphuric acid it is $9\times10^{-8}$ at 18° C.).

The difference in dissociation behavior between monoethanolamine sulphide and monoethanolamine carbonate also becomes evident when an aqueous solution containing a mixture of the two salts is boiled at atmospheric pressure. Since the monoethanolamine sulphide dissociates more readily than the carbonate, the first acid liberated from the solution will be predominantly hydrogen sulphide with the carbon dioxide being liberated after the bulk of the hydrogen sulphide has been boiled out of the solution.

I have now discovered that by boiling and steam stripping monoethanolamine carbonate and bicarbonate solutions at superatmospheric pressure, (preferably from 30 to 85 pounds per square inch absolute pressure), it is possible to obtain substantially complete separation of carbon dioxide from monoethanolamine in these solutions with a moderate usage of stripping steam.

This is contrary to usual results in steam stripping operations because an increase in pressure decreases the specific volume of the stripping steam, and also increases the partial pressure of the volatile constituent over the solution for a given volume ratio of volatile constituent to steam. In the case of monoethanolamine carbonate, however, I have discovered that both of these adverse effects of pressure are more than overcome by the marked increase in the dissociation of the monoethanolamine carbonate at the higher boiling temperature of the solution resulting from the elevated pressure.

In addition to the primary reactions between monoethanolamine and hydrosulphuric and carbonic acids, the following secondary reactions occur as well:

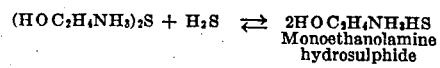

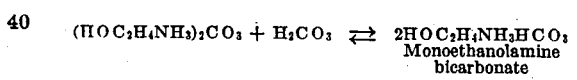

These reactions are also reversible the equilibria depending upon the concentration of the reactants and the temperature.

Monoethanolamine hydrosulphide and bicarbonate exist only at relatively high partial pressures of hydrogen sulphide and carbon dioxide. I have discovered that these compounds can be dissociated with ease as compared with monoethanolamine sulphide and carbonate. Therefore, conditions suitable for dissociating the sulphide or carbonate will cause dissociation of the hydrosulphide and bicarbonate.

It is likely that monoethanolamine exists at least in part in aqueous solution as the corresponding substituted ammonium hydroxide ($HOC_2H_4NH_3OH$), but for simplicity the amino form has been used in the equations hereinbefore cited.

The change in dissociation pressure with change in temperature for monoethanolamine carbonate and bicarbonate and the equilibrium carbon dioxide partial pressures over a 2.5 normal aqueous monoethanolamine solution at various temperatures have been determined and are shown in Figure 1. In this figure the abscissas indicate partial pressures of $CO_2$ in pounds per square inch absolute over a 2.5 normal solution of monoethanolamine in water and are spaced in accordance with a logarithmic scale, and the ordinates indicate the $CO_2$ content of the solution in mols of $CO_2$ per mol of monoethanolamine. Thus an ordinate of 0 indicates the absence of $CO_2$ and an ordinate of 1.00 indicates 1 mol of $CO_2$ for each mol of the monoethanolamine. As to whether the carbonate or the bicarbonate is present depends on the ratio of $CO_2$ to monoethanolamine. The following table is given to indicate the mol ratio for the different amounts of $CO_2$ present per mol of monoethanolamine (designated as MEA:)

Table

| Mols $CO_2$ in solution | Mols of free MEA | Mols of carbonate | Mols of bicarbonate |
| --- | --- | --- | --- |
| 0.00 | 1.00 | 0.00 | 0.00 |
| 0.10 | 0.80 | 0.10 | 0.00 |
| 0.20 | 0.60 | 0.20 | 0.00 |
| 0.30 | 0.40 | 0.30 | 0.00 |
| 0.40 | 0.20 | 0.40 | 0.00 |
| 0.50 | 0.00 | 0.50 | 0.00 |
| 0.60 | 0.00 | 0.40 | 0.20 |
| 0.70 | 0.00 | 0.30 | 0.40 |
| 0.80 | 0.00 | 0.20 | 0.60 |
| 0.90 | 0.00 | 0.10 | 0.80 |
| 1.00 | 0.00 | 0.00 | 1.00 |

On Fig. 1 are plotted the lines indicating the partial pressure of $CO_2$ required to maintain equilibrium for different ratios of $CO_2$ to monoethanolamine in the solution at different temperatures.

From the above table it will be seen that when 0.50 mols of $CO_2$ are present in the solution per mol of monoethanolamine, all of the monoethanolamine has united with $CO_2$ to form the carbonate, and that stoichiometrically there is no free amine or free $CO_2$ or bicarbonate. Then from Fig. 1 it will be observed that for a ratio of 0.50 mols $CO_2$ to one mol monoethanolamine, the carbon dioxide partial pressure over a 2.5 normal aqueous solution of the monoethanolamine carbonate is about 110 pounds per square inch absolute pressure at 140° C., while at 100° C. the carbon dioxide partial pressure over this solution for the 0.50 mol ratio is only about 25 pounds per square inch absolute pressure. Consequently, the dissociation of monoethanolamine carbonate will proceed much more readily at 140° C. than at 100° C., even though a given weight of stripping steam has less diluting effect in the vapor phase due to its lower specific volume.

As the bicarbonate is present where the ratio of mols of $CO_2$ to monoethanolamine is above 0.5 to 1, it will appear from Fig. 1 that for instance when the ratio is 0.6 to 1, 70 pounds partial pressure of $CO_2$ is required to maintain equilibrium at 100° C. but about 250 pounds is required at 140° C.

Figure 2:
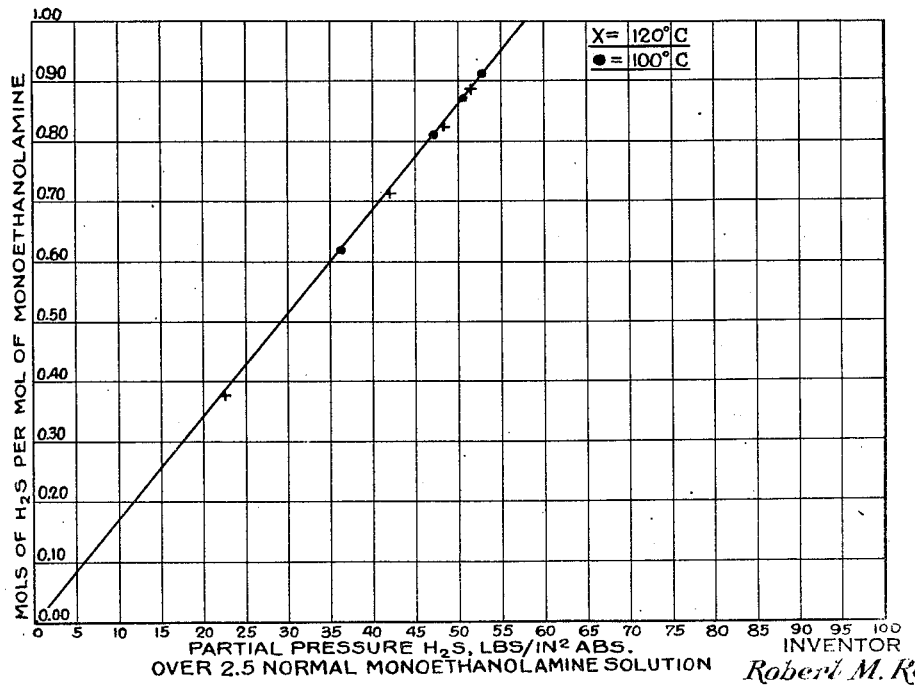

The partial pressure behavior of hydrogen sulphide over a 2.5 normal monoethanolamine solution at 100° C. and 120° C. has also been determined and is given in Fig. 2. The Figures show two significant differences in behavior between monoethanolamine sulphide and monoethanolamine carbonate. The carbon dioxide partial pressure over a monoethanolamine solution deviates sharply from Henry's law, and increases markedly on increasing the temperature from 100° C. to 120° or 140° C. In contrast, the partial pressure of hydrogen sulphide over a monoethanolamine solution follows Henry's law closely over the range studied, and furthermore does not show a measurable temperature coefficient between 100° C. and 120° C.

Hence, since hydrogen sulphide follows Henry's law as above indicated, it may be assumed that at 100° C., monoethanolamine sulphide is completely dissociated chemically and the hydrogen sulphide present in the solution is held by physical solubility. In this case there is no advantage to be gained in increasing the dissociation temperature, such as was the case with monoethanolamine carbonate. As mentioned previously, the increase in total pressure necessary to obtain a higher temperature makes the overall stripping conditions less favorable, and with monoethanolamine sulphide there is no increase in dissociation pressure to offset this.

Thus, monoethanolamine sulphide in an aqueous solution may be most advantageously dissociated by heating at atmospheric pressure, rather than at superatmospheric pressures.

However, with an aqueous solution containing a mixture of monoethanolamine sulphide and carbonate, I have found that substantially complete dissociation of the salts may be obtained more economically at superatmospheric pressures than at atmospheric pressure. At atmospheric pressure, an excessive amount of boiling is required to dissociate the monoethanolamine carbonate present in the solution. At superatmospheric pressure, the monoethanolamine sulphide will be completely dissociated by the time enough boiling has occurred to dissociate the major portion of the monoethanolamine carbonate so that no extra boiling will be required to dissociate the monoethanolamine sulphide. The total heating required to dissociate the mixture at superatmospheric pressure will be considerably less than at atmospheric pressure.

By utilizing the above mentioned differences in the dissociation behavior of monoethanolamine sulphide and carbonate, it is possible to separately recover hydrogen sulphide and carbon dioxide from a solution containing both by varying the conditions under which a mixture of the monoethanolamine salts of these two acids is subjected to thermal dissociation. The separation can be effected by boiling and steam stripping aqueous solutions containing mixtures of monoethanolamine carbonate and sulphide at substantially atmospheric pressure to dissociate the major portion of the monoethanolamine sulphide, after which the solution is boiled and steam stripped at superatmospheric pressure to dissociate the monoethanolamine carbonate. By "substantially atmospheric pressure" I designate pressures below 30 pounds per square inch absolute pressure, while "superatmospheric pressure" refers to pressures between 30 and 85 pounds per square inch absolute pressure.

The preferential dissociation of monoethanolamine salts is illustrated by the following example. An aqueous solution containing 0.009 pound mols of monoethanolamine sulphide and 0.009 pound mols of monoethanolamine carbonate per gallon was boiled and steam stripped in a short stripping column at 17 pounds per square inch absolute pressure. The stripping steam used amounted to 0.039 pound mols per gallon of solution. After stripping, the solution was found to contain 0.0007 pound mols of monoethanolamine sulphide, 0.0076 pound mols of monoethanolamine carbonate and 0.020 pound mols of free monoethanolamine per gallon. 92.2% of the monoethanolamine sulphide was dissociated under these conditions, but only 15.6% of the monoethanolamine carbonate was dissociated. After condensing the stripping steam from the evolved mixture of hydrogen sulphide and carbon dioxide, the cooled gas was found to consist of 85.5% hydrogen sulphide and 14.5% carbon dioxide. The solution was then boiled and steam stripped at 56 pounds per square inch absolute pressure to dissociate the monoethanolamine carbonate. The stripping steam used amounted to 0.042 pound mols per gallon of solution. After this operation the solution contained 0.00004 pound mols of monoethanolamine sulphide, 0.0025 pound mols of monoethanolamine carbonate, and 0.031 pound mols of free monoethanolamine per gallon. The gas evolved in the second stripping operation contained 88.5% carbon dioxide and 11.5% hydrogen sulphide after cooling.

The following example illustrates the increased efficiency obtainable in the thermal dissociation of monoethanolamine carbonate alone under superatmospheric pressure as compared to operation at atmospheric pressure. An aqueous solution containing 0.0180 pound mols of monoethanolamine carbonate and 0.0038 pound mols of free monoethanolamine per gallon was boiled and steam stripped at 20 pounds per square inch absolute pressure, using 0.033 pound mols of stripping steam per gallon of solution. The solution then contained 0.0075 pound mols of monoethanolamine carbonate and 0.0248 pound mols of free monoethanolamine per gallon. A similar solution containing 0.0135 pound mols of monoethanolamine carbonate and 0.0125 pound mols of free monoethanolamine per gallon was boiled and steam stripped at 60 pounds per square inch absolute pressure, using 0.031 pound mols of stripping steam per gallon. The solution then contained 0.0037 pound mols of monoethanolamine carbonate and 0.0324 pound mols of free monoethanolamine per gallon. The dissociation of monoethanolamine carbonate at 60 pounds per square inch absolute pressure proceeded to the extent that the residual monoethanolamine carbonate amounted to 0.11 mols per mol of free monoethanolamine present, as compared to 0.30 mols of monoethanolamine carbonate per mol of free monoethanolamine after dissociation at 20 pounds per square inch absolute pressure.

"Stripping steam" as used herein refers to steam passing through or over a solution for the purpose of reducing the partial pressure of hydrogen sulphide or carbon dioxide over the solution and separating the gas therefrom. It may be produced by boiling a portion of the solution with external heat, or live steam may be introduced directly into or over the boiling solution. Available process steam, such as steam obtained during the dissociation of alkali salts of mercaptans may be employed for this purpose. Other inert gases, such as natural gas or nitrogen, may also be employed as a stripping medium and are equivalent to "stripping steam" in my process.

Having thus described my invention, what I claim as new and desire to secure by Letters Patent is:

1. A thermal dissociation process of separating and recovering hydrogen sulphide and carbon dioxide from an aqueous solution containing a mixture of monoethanolamine salts of hydrosulphuric and carbonic acids which comprises boiling and steam stripping the solution at substantially atmospheric pressure until a major portion of monoethanolamine sulphide has been thermally dissociated and hydrogen sulphide gas liberated therefrom, and a minor portion of monoethanolamine carbonate has been thermally dissociated thereby liberating carbon dioxide gas therefrom, condensing the stripping steam from the mixture of hydrogen sulphide and carbon dioxide gases, separating the mixture of gases, then subjecting the solution to boiling and steam stripping at such superatmospheric pressure that the remainder of the monoethanolamine carbonate is dissociated and a major portion of carbon dioxide gas is liberated therefrom.

2. A process of thermally dissociating, separating and recovering hydrogen sulphide and carbon dioxide from an aqueous solution containing a mixture of monoethanolamine salts of hydrosulphuric and carbonic acids which comprises effecting a primary thermal dissociation by boiling and steam stripping the solution at a pressure below 30 pounds per square inch absolute pressure until said salts have liberated approximately 90% of the hydrogen sulphide and approximately 15% of the carbon dioxide contained therein, separating the gases from said stripping steam, and thereafter effecting a secondary thermal dissociation by boiling and steam stripping the solution at a pressure between 30 and 85 pounds per square inch absolute pressure until said salts have liberated substantially all of the remaining combined hydrogen sulphide and carbon dioxide gases.

3. A process as set forth in claim 2 in which the stripping medium is an inert gas.

4. A process for the thermal dissociation of mixtures of monoethanolamine salts of hydrosulphuric and carbonic acids in aqueous solution, which comprises boiling and steam stripping the solution while maintaining an absolute pressure between 30 and 85 pounds per square inch on the solution during such boiling.

5. A process for the thermal dissociation of monoethanolamine salts of carbonic acid in aqueous solution and the removal of carbon dioxide therefrom, which comprises boiling and steam stripping the solution while maintaining an absolute pressure between 30 and 85 pounds per square inch on the solution during such boiling.

6. A process for the thermal dissociation of monoethanolamine salts of carbonic acid in aqueous solution and the removal of carbon dioxide therefrom, which includes boiling the solution while maintaining an absolute pressure between 30 and 85 pounds per square inch on the solution during such boiling.

7. The process of thermally dissociating and removing hydrogen sulphide and carbon dioxide from an aqueous solution containing a mixture of monoethanolamine salts of hydrosulphuric and carbonic acids, which comprises boiling and steam stripping the solution at substantially atmospheric pressure until a major portion of monoethanolamine sulphide has been thermally dissociated and hydrogen sulphide gas liberated therefrom, and a minor portion of monoethanolamine carbonate has been dissociated and carbon dioxide gas liberated therefrom, and then subjecting the solution to boiling and steam stripping at such superatmospheric pressure that the remainder of the monoethanolamine carbonate is dissociated and substantially all of the remaining portion of the carbon dioxide gas is liberated therefrom.

8. The process of thermally dissociating and removing hydrogen sulphide and carbon dioxide from an aqueous solution containing a mixture of monoethanolamine salts of hydrosulphuric and carbonic acids, which comprises boiling and steam stripping the solution at substantially atmospheric pressure until a major portion of monoethanolamine sulphide has been thermally dissociated and hydrogen sulphide gas liberated therefrom, and then subjecting the solution to boiling and steam stripping at such superatmospheric pressure that the monoethanolamine carbonate is dissociated and carbon dioxide gas is liberated therefrom.

9. The process of thermally dissociating and removing hydrogen sulphide and carbon dioxide from an aqueous solution containing a mixture of monoethanolamine salts of hydrosulphuric and carbonic acids, which comprises boiling and steam stripping the solution at substantially atmospheric pressure until a major portion of monoethanolamine sulphide has been thermally dissociated and hydrogen sulphide gas liberated therefrom, and then subjecting the solution to boiling and steam stripping at a superatmospheric pressure of 30 to 80 pounds per square inch absolute, so that the monoethanolamine carbonate is dissociated and carbon dioxide gas is liberated therefrom.

ROBERT M. REED.